United States Patent [19]

Napierski

[11] Patent Number: 4,733,832

[45] Date of Patent: Mar. 29, 1988

[54] CABLE WINDING DEVICE

[76] Inventor: Reinhard Napierski, Talstrasse 18, D-6361 Niddatal 1, Fed. Rep. of Germany

[21] Appl. No.: 913,471

[22] Filed: Sep. 30, 1986

[30] Foreign Application Priority Data

Oct. 1, 1985 [DE] Fed. Rep. of Germany ....... 3534956
Nov. 12, 1985 [DE] Fed. Rep. of Germany ....... 3540012

[51] Int. Cl.$^4$ .............................................. B65H 75/48
[52] U.S. Cl. ..................... 242/107.6; 242/118.41
[58] Field of Search ................. 242/107.6, 107.7, 107, 242/107.1, 100, 86, 85, 96, 118.41

[56] References Cited

U.S. PATENT DOCUMENTS

| 887,689 | 5/1908 | Olop | 242/107.6 |
|---|---|---|---|
| 1,171,745 | 2/1916 | Mundy | 242/107 |
| 1,863,620 | 6/1932 | Carouso | 242/107.6 |
| 2,438,515 | 3/1948 | Mohler | 242/107.1 X |
| 2,976,374 | 3/1961 | Poulsen | 242/107 X |
| 3,067,965 | 12/1962 | Breithaupt | 242/118.41 X |
| 3,409,246 | 11/1968 | De Pas | 242/107 |
| 3,593,941 | 7/1971 | Smith | 42/107 |
| 4,101,090 | 7/1978 | Wait | 242/96 |
| 4,386,621 | 6/1983 | Redl | 242/118.41 X |

Primary Examiner—John M. Jillions
Attorney, Agent, or Firm—Larson and Taylor

[57] ABSTRACT

A device for winding a cable comprises a housing (51) with a feed and discharge guide (58) for the cable (16) and a cable drum (46) which is mounted rotatably in the housing and to which one end of the cable is fastened. In order to precisely guide the cable onto the cable drum during winding, the cable drum is provided with at least two winding chambers (52,54) separated by a middle partition (50). When the first winding chamber is filled at least one cable deflecting device or bar (64) mounted radially outside the middle partition deflects the cable over the middle partition into the second winding chamber. The deflecting device can be defined by a guide wall (60) of the feed and discharge guide (58).

9 Claims, 8 Drawing Figures

CABLE WINDING DEVICE

FIELD OF THE INVENTION the invention relates to devices for winding cable of the type which comprise a housing with a feed and discharge guide for the cable and a cable drum which is mounted for rotation in the housing and to one end of which the cable is fastened.

BACKGROUND OF THE INVENTION

In conventional winding devices, such as have been described, for example, in DE-OS No. 25 44 828 and in DE-GM No. 79 12 019, the middle of the cable to be wound is fastened to an intermediate partition on a cable drum so that, in operation, the cable is fed into or pulled out of the device using two feed and discharge guides. These devices suffer the drawback that they are disposed between the device (appliance) attached to the cable and a plug on the end of the cable, and this arrangement can be quite inconvenient, e.g., in a hair dryer which is manipulated manually.

Given a certain length of cable to be wound, the aforementioned prior art devices, i.e., those including two feed and discharge guides, have the advantage that, from the beginning, only half of the cable length need be fed into each of the two winding chambers on each side of a separating partition. However, this arrangement does not avoid the problem which can occur during winding of a cable, especially a flat cable, resulting from the fact that the windings or turns of the cable tend to lie one directly over the other and to thus form a narrow, but radially thick, coil on the drum. Such a thick coil can cause jamming of the cable drum in the housing, before a winding chamber has been filled over its entire breadth (axial width). Such jamming during winding of the cable has resulted in the provision of winding chambers of considerable volume, with a suitably large diameter. This can be cumbersome and disadvantageous particularly where, e.g., the cable winder, or an apparatus including the cable winder, must be handled manually. The aforementioned problem presented by an abnormally narrow build-up of the winding turns is a particular drawback when the cable is attached by one end to the cable drum, so that the entire length of cable to be wound is drawn in and pulled out using a single feed and discharge guide.

SUMMARY OF THE INVENTION

The object of the present invention is to provide a cable winding device of the type discussed above in which the coils or turns of the cable formed during winding are arranged next to each other during the winding operation. This object is attained according to the invention through the provision of a cable drum having at least two winding chambers separated by a radially extending intermediate partition. Further, associated with the first winding chamber, i.e., the chamber in which one end of the cable is fastened to the drum, is at least one deflector member which is disposed radially outwardly of the intermediate partition, whereby, following filling up of the first winding chamber, the cable can be lead or directed, during winding, over the outside radial edge of the intermediate partition into the second winding chamber.

The cable winding device of the invention overcomes the problems associated with the behavior of the cable in winding devices of prior art wherein the cable turns are stacked one on top of the other and at the same time provides that the windings remain in a defined axial area of the cable drum, i.e., in the first cable chamber. Moreover, the device of the invention also provides in that after a certain number of turns or windings, i.e., a number sufficient to fill the space defined by the first winding chamber up to the outside edge of the intermediate partition, the cable is carried or directed by the deflector member over that edge into the second winding chamber, wherein the cable can then be built up by turns or windings formed one over the other.

In most uses, two separate coils of this type wound onto the cable drum should suffice. When a longer cable is to be wound using a single feed and discharge guide, a deflector member can be used which incorporates a biasing element, e.g., a flat spring or some other spring element with considerable spring bias, which is adapted to force the cable not only over a first intermediate partition into a second winding chamber, but also, after filling of that chamber, to force the cable over a second intermediate partition into a third winding chamber.

In accordance with the present invention, the end of the cable which is fastened to the cable drum in the first winding chamber can also be in a suitable position, especially in the middle of a cable, to be connected or fastened, in a known manner in winding devices with two feed and discharge guides, to an intermediate radially extending partition of the cable drum. In this case, the cable drum may include four winding chambers. When the cable is pulled, the cable runs first through each of the two feed and discharge guides into one of the two inside winding chambers. When this chamber is filled, the deflector members conduct both wound-on cable ends in turn into one of the two outside winding chambers. When, in a winding device of this type, i.e., a device with two feed and discharge guides, the middle of the cable is fastened to the hub of the cable drum, both cable ends appear from there in the two outside chambers of the four winding chambers, and can also be conducted by the deflector bars or members into the two inside winding chambers, when the outside chambers are filled.

BRIEF SUMMARY OF THE DRAWINGS

The invention is explained in more detail hereinafter relative to the drawings. The drawings show.

DESCRIPTION OF THE PREFERRED EMBODIMENTS

Figure 1:
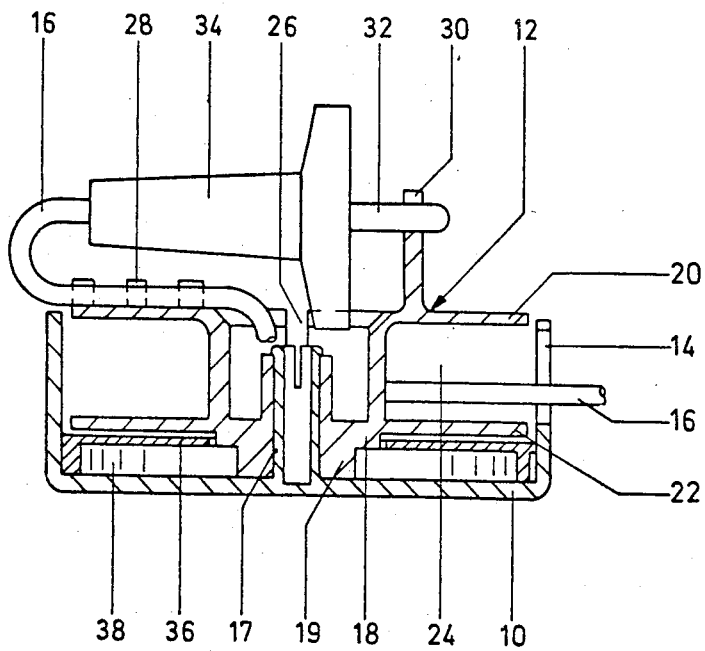
FIG. 1, a longitudinal section through a cable winding device constructed in accordance with one embodiment of the invention and adapted to support the free end of the connection cable of an electrical device with a detachable electric plug.
Figure 4:
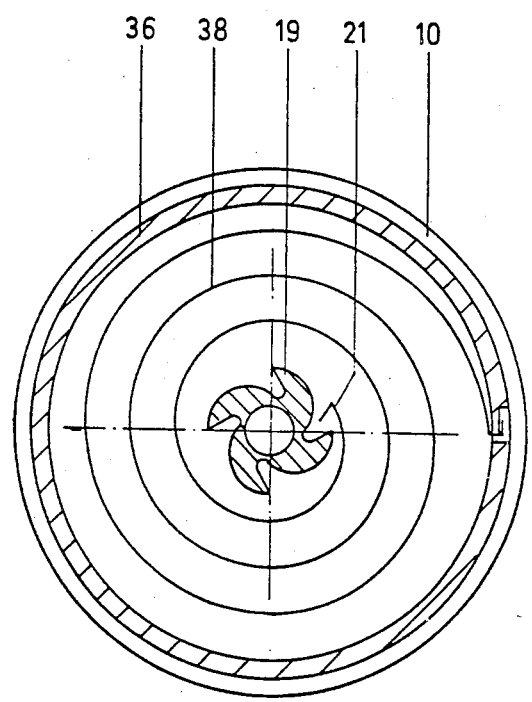
FIG. 4, a plan view of a winding device as in FIG. 1 and FIG. 3, which is represented in cross section in the area of the spiral spring incorporated therein.

The device shown in FIG. 1 is adapted for the winding of a cable and includes a one-part housing 10, the sides of which extend upwardly, as viewed in FIG. 1, an amount sufficient to permit a cable drum 12 to be received therein. Housing 10 includes a feed and discharge guide 14 for a cable 16 which is adapted to be wound on cable drum 12. Drum 12 comprises a central hub 18 and upper and lower laterally, i.e., radially, extending walls 20, 22 which extend outwardly from hub 18. The radial walls 20 and 22 form a winding chamber 24, which houses the wound cable. Hub 18 is mounted for rotation on a central, upwardly projecting journal 17 formed on housing 10 and including radially extending resilient noses at the free end of journal 17 which limit axial movement of hub 18. Hub 18 further includes a star-shaped control member 19 which projects below the bottom wall 22 and the shape of which is best seen in FIG. 4. Control member 19 resiliently retains the inner end 21 of a spiral spring 38 which is mounted within the housing 10 beneath bottom wall 22. Spring 38 is relaxed and is not engaged by member 19, during clockwise rotation of the latter; however, spring 38 is engaged during counterclockwise rotation of member 19 and further rotation biases or tightens the spring.

Figure 2:
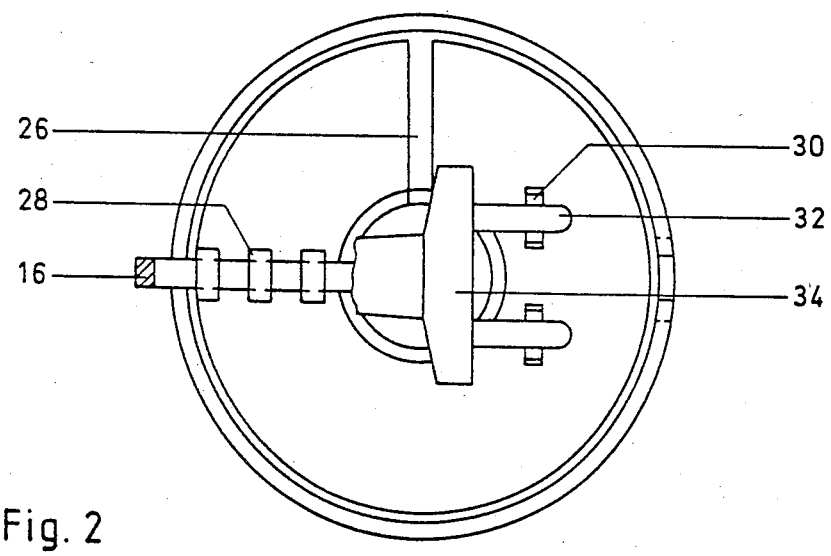
FIG. 2, a plan view of the winding device of FIG. 1.
Figure 3:
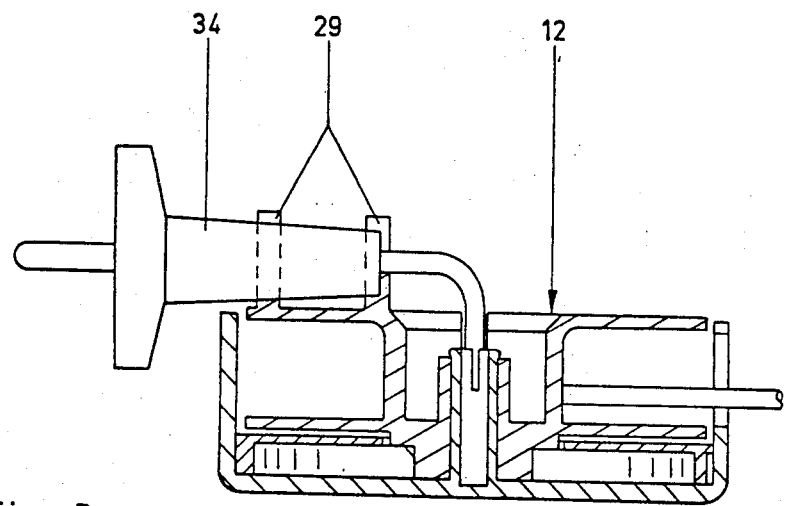
FIG. 3, a longitudinal section through another embodiment of a winding device in accordance with the invention.

Cable drum 12 has a radially extending slot 26 therein, which as shown in FIG. 2 extends from the outside edge of the top or upper wall 20 to the hub 18. Wall 20 serves in defining an upper space in which cable 16 is received as shown in Figs. 1 and 3, and includes holders 28 for retaining a portion of cable 16. Holders 28 are formed on top wall 20 and are arranged so as to open on the side and thus receive cable 16. Wall 20 also includes further holders 30 (see FIGS. 1 and 2) for contacts 32 of an electrical plug 34. Cable is inserted into housing 10 when slot 26 in wall 20 of cable drum 12 is brought into alignment with the feed and discharge guide 14 of housing 10. Guide 14 is formed by a slot in the side wall of housing 10 which is open at the top. Cable 16 is then guided into holders 28 and clamped tightly therein. Thus plug 34 of cable 16 is freely movable and can if desired be inserted into a socket (not shown) or, as shown in FIG. 1, can be fixed in place, with contacts 32 received in holder 30.

A spring holder 36 is affixed in housing 10 and serves to house the spring 38 and limit the outward thrust thereof. The inside, free end 21 of spring 38 is disposed in a location in which it can be engaged by member 19 during counterclockwise rotation of the latter. Of course, the spring holder 36 can also be mounted on cable drum 12 and the member 19 on the housing 10.

To provide changing of the cable, cable drum 12 must be removed from housing 10 in order to permit unwinding of the cable. A new cable is then placed therein, and the cable need be wound by hand for only the first turn around the drum.

FIG. 3 shows another embodiment of the invention, wherein plug 34 is permitted to be plugged into a socket without being removed from its holder 29. In this specific embodiment, plug 34 is located outside of cable drum 12; the possibility also exists of arranging plug 34 in axial alignment in a suitable holder. Holder 29 is designed to clamp plug 34 tightly that plug 34 is maintained in place during insertion of the plug into, and withdrawal of the plug from, the socket.

Figure 5:
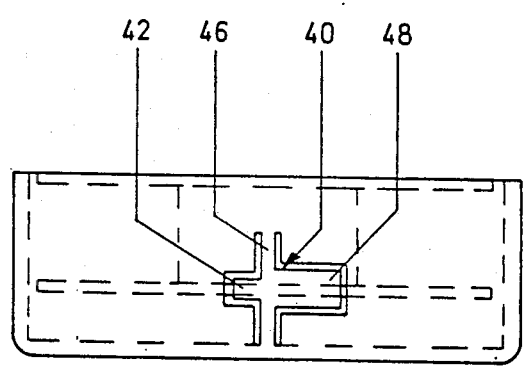
FIG. 5, a side view of a winding device including a one piece pawl configured to be integral with the housing.
Figure 6:
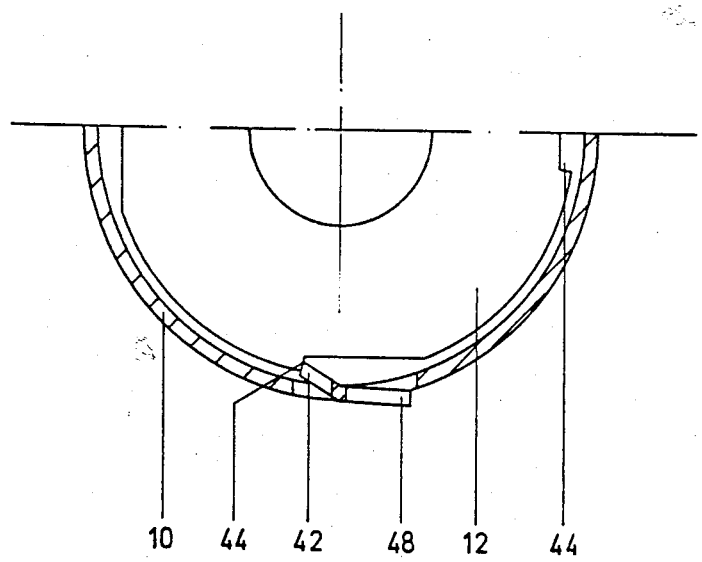
FIG. 6, a plan view of the winding device of FIG. 5, which is represented in cross section in the area of the pawl.

FIGS. 5 and 6 show an embodiment including a pawl 40 formed integrally with housing 10. In this embodiment, pawl 40 consists of a detent 42 which engages in recesses 44 of cable drum 12, a spring portion 46 and a pressure plate 48, are formed in the wall of housing 10. Detent 42 extends obliquely inwardly in one direction and prevents cable drum 12 from rotating in the winding direction of the cable. If the cable is to be pulled out, pressure plate 48 is then pressed and detent 42 is withdrawn to free cable drum 12, so that spring 38 draws the cable on drum 12 back. Pressure plate 48 need not be pressed in order to pull the cable back from cable drum 12, since when plate 48 is released, detent 42 is biased inwardly by spring portion 46 and thus stops cable drum 12 immediately, when a recess 44 is engaged thereby.

Of course, other structural variations of the pawl, which can also be integral with the housing, are possible. In the exemplary embodiment illustrated, spring portion 46 functions as a torsion spring, as well as the pivot axis of pawl 40. It is conceivable to construct the spring portion as a flat spring, so that the pivot point is also located in the area of the flat spring.

Furthermore, it is to be understood that the one-piece construction of the pawl and housing is independent of the construction of the cable drum and is also independent of that point where the pawl engages on the cable drum. Such a pawl can, therefore, also be used with winding devices of the type described above but with two feed and discharge guides. Further, where the winding device is not a separate unit, but rather is part of a larger apparatus such as a hair dryer, the pawl can be manufactured so as to be integral with the housing of the hair dryer.

Figure 7:
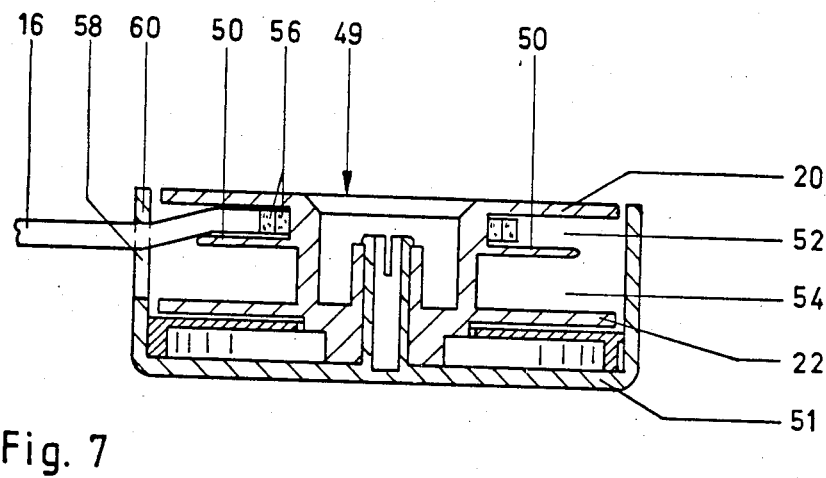
FIG. 7, a longitudinal section through a winding device constructed in accordance with a further embodiment of the invention.
Figure 8:
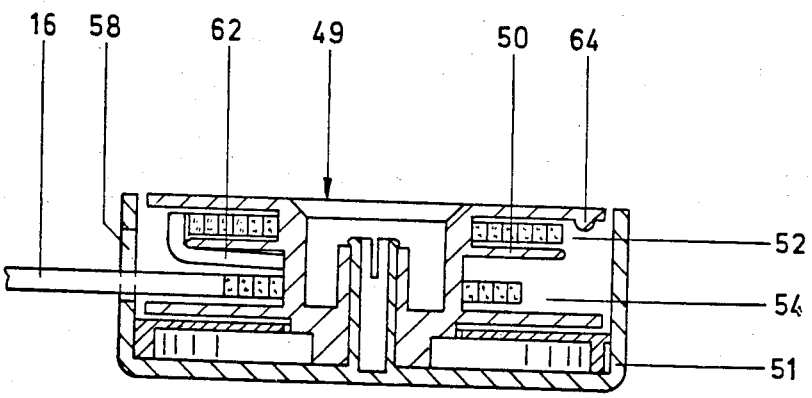
FIG. 8, a longitudinal section through a cable winding device similar to that of FIG. 8, showing a further step in the winding operation.

Referring to FIGS. 7 and 8, a winding device is shown in which the cable drum has an intermediate, radially extending partition or wall 50 between the radially extending walls 20, 22. Wall 50 subdivides the chamber between the two walls 20, 22 into two winding chambers 52 and 54.

One phase of the winding operation is shown in FIG. 7, wherein cable 16 is laid in or inserted into winding chamber 52 in such a manner that the cable can be built up on the drum from the inside. As illustrated, two coils 56 are already wound on the drum. In order to wind on the next windings, the rotating cable drum draws cable 16 into winding chamber 52. Cable 16 is however guided in exact alignment by the feed and discharge guide 58, located opposite winding chamber 52, and especially by an offset wall 60, so that, when winding chamber 52 is filled, the cable 16 runs on further, i.e., continues to be wound, as a result of the thrust or extent of the partition 50, but because the new turn cannot be held in place, i.e., supported, by partition 50 after passing by the edge thereof, the cable drops into winding chamber 54.

FIG. 8 shows a further step in the winding operation, viz., the transfer of a portion 62 of cable 16 into winding chamber 54. Since transfer portion 62 is guided into the inside of winding chamber 54, turns of cable 16 can now once again build up from the inside.

In this embodiment, a cable drum 49 and a housing 51 of the construction indicated are required to have a packing between first winding chamber 52 and feed and discharge guide 58. The size of the packing however is dependent upon the relevant diameters of feed and discharge guide 58 and intermediate partition 50. The possibility also exists that when the winding chamber is filled, a deflector member or bar 64 can be used to press the top turn or coil in winding chamber 54 over the edge of partition 50; then the packing for the feed and discharge guide 58 is not required. Deflector bar 64 can be constructed so that it extends around the entire periphery of, or is formed in segments on, wall 20.

There is also the possibility of using a cable drum with a plurality of winding chambers in which cable 16 is pressed or transferred over into the next chamber, and a deflector bar 64 would not be required in the last winding chamber. For improved and precise transfer of cable 16 from one chamber into the other, cutouts or recesses can be made in the relevant intermediate partition. be constructed so that it extends around the entire periphery of, or is formed in segments on, wall 20.

There is also the possibility of using a cable drum with a plurality of winding chambers in which cable 16 is pressed or transferred over into the next chamber, and a deflector bar 64 would not be required in the last winding chamber. For improved and precise transfer of cable 16 from one chamber into the other, cutouts or recesses can be made in the relevant intermediate partition.

I claim:

1. A device for winding a cable, said device comprising housing including a feed and discharge guide for the cable and a cable drum which is rotatably mounted in the housing and to which one end of the cable is fastened, said cable drum including at least two separate winding chambers separated by a radially extending, intermediate partition, the end of the cable being fastened to the cable drum in said first winding chamber and said first winding chamber including at least one deflector means, mounted radially outwardly of said partition, for, when the winding has filled the first winding chamber, deflecting the cable over the outer radial edge of the intermediate partition into the second winding chamber, said at least one deflector means comprising a guide member provided on the housing which controls winding of the cable onto the drum in the first winding chamber above the intermediate partition, said guide member comprising a surface of the feed and discharge guide, and the feed and discharge guide being disposed radially outwardly of the second winding chamber and extending from a point located outwardly of the first winding chamber approximately half the width of the cable from the intermediate partition to the area radially outwardly of the second winding chamber.

2. A device as claimed in claim 1, wherein the first winding chamber is narrower axially than the second winding chamber and the axial width of the second winding chamber is greater than double the width of the cable.

3. A device as claimed in claim 1, wherein said housing includes an integral pawl and the cable drum includes a limiting wall partially defining one of said chambers, said limiting wall including a recess forming a stop which is adapted to engage said pawl.

4. A device as claimed in claim 3, wherein the pawl comprises a detent portion for engaging said stop, a spring portion for biassing said detent portion in a direction so as to engage said stop, and a pressure plate actuator portion for, when actuated, releasing said detent portion from said stop.

5. A device as claimed in claim 4 wherein said pawl is pivotable and said spring portion of said pawl defines the pivot axis of the pawl.

6. A device as claimed in claim 1, wherein the end of cable attached to the cable drum is guided axially by a cable guide portion so as to be transferred axially from the cable drum, said device further including holding members for holding the transferred portion of the cable.

7. A device as claimed in claim 3 further comprising a spiral spring for providing rotation of said cable drum.

8. A device as claimed in claim 1 wherein the narrowness of the width of the first winding chamber relative to the width of the cable is such that the cable windings build one upon the other during winding of the cable on the drum within the first winding chamber.

9. A device for winding a cable, said device comprising a housing including a feed and discharge guide for the cable and a cable drum which is rotatably mounted in the housing and to which one end of the cable is fastened, said cable drum including at least two separate winding chambers separated by a radially extending, intermediate partition, the end of the cable being fastened to the cable drum in said first winding chamber and said first winding chamber including at least one deflector means, mounted radially outwardly of said partition, for, when the winding has filled the first winding chamber, deflecting the cable over the outer radial edge of the intermediate partition into the second winding chamber, said at least one deflector means being mounted on the cable drum.

* * * * *